United States Patent [19]
Smith

[11] 4,102,213
[45] Jul. 25, 1978

[54] DOOR LOCK ACTUATOR UNIT

[75] Inventor: Lynn C. Smith, Willoughby Hills, Ohio

[73] Assignee: Design & Manufacturing Corporation, Willoughby, Ohio

[21] Appl. No.: 732,652

[22] Filed: Oct. 15, 1976

[51] Int. Cl.² .............................................. F16H 21/44
[52] U.S. Cl. ...................................... 74/110; 292/201; 292/144; 64/27 C
[58] Field of Search .................. 74/110; 292/201, 144; 60/513; 64/15 C, 27 C, DIG. 2

[56] References Cited

U.S. PATENT DOCUMENTS

| | | | |
|---|---|---|---|
| 1,417,430 | 5/1922 | Tolloch et al. | 292/201 |
| 3,751,950 | 8/1973 | Leger et al. | 292/201 |
| 3,897,093 | 7/1975 | Wiczer et al. | 292/144 |
| 3,917,327 | 11/1975 | Plasko | 292/201 |

*Primary Examiner*—Benjamin W. Wyche
*Assistant Examiner*—Wesley S. Ratliff, Jr.
*Attorney, Agent, or Firm*—Maky, Renner, Otto & Boisselle

[57] ABSTRACT

An actuator unit for door locks or similar output devices includes two spaced linear actuators selectively operative respectively to lock or unlock the door through a common pivotally mounted link assembly. Such link assembly includes a lost motion connection to permit the energized actuator normally to cycle even if the door lock lever is being held to preclude movement thereof to the selected lock mode.

10 Claims, 8 Drawing Figures

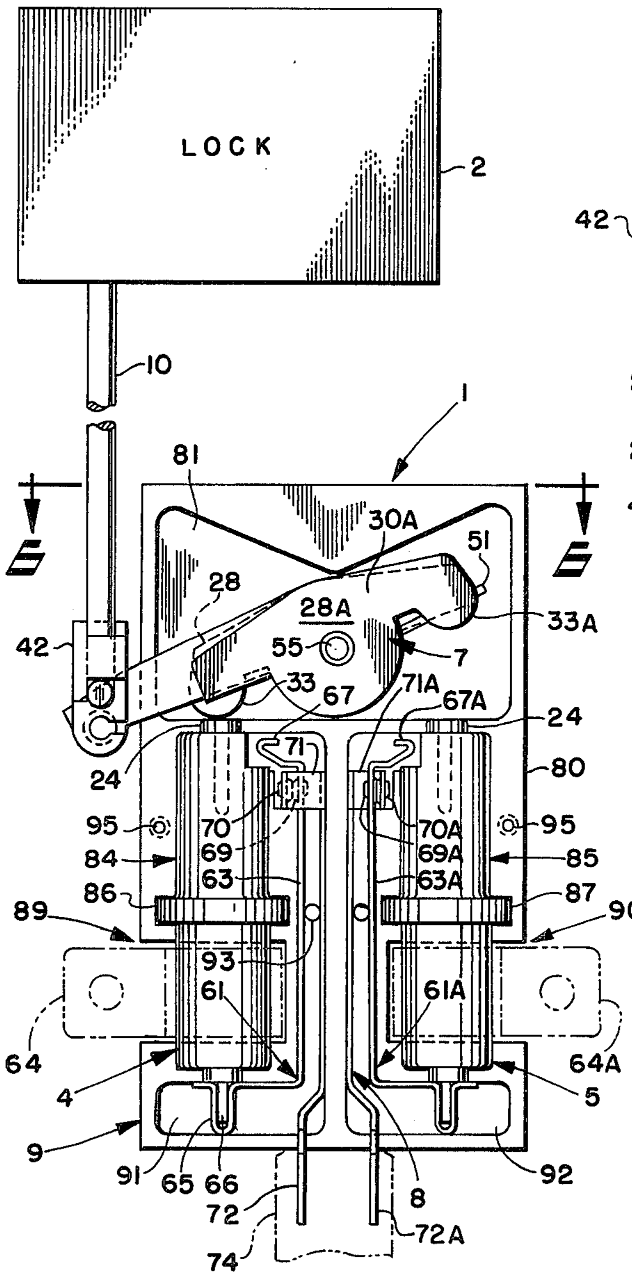
FIG. 1
FIG. 3
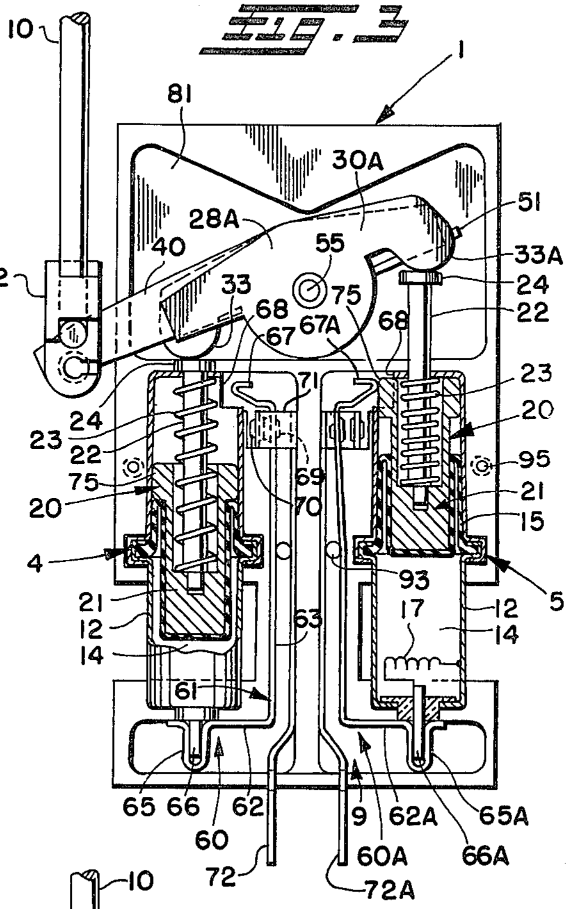
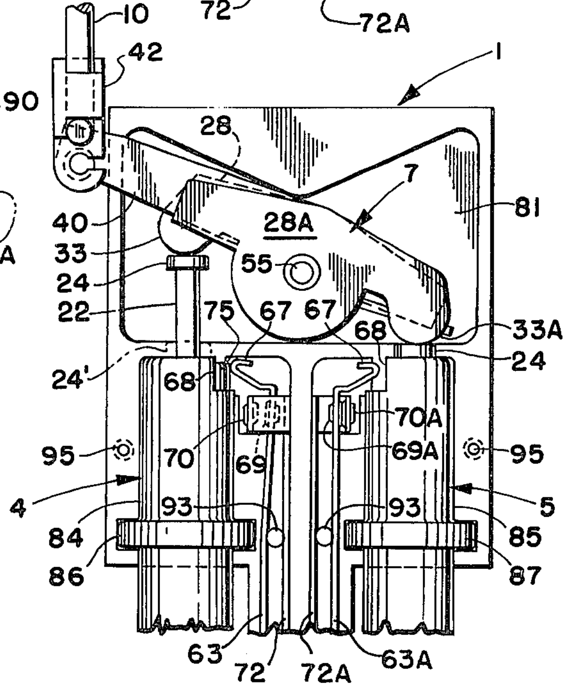
FIG. 2

DOOR LOCK ACTUATOR UNIT

The present invention relates in general to an actuator unit for vehicle door locks or the like and in particular to a lost motion connection in such unit to permit override of the same during energization of the actuators.

In co-pending and co-assigned Birli et al application Ser. No. 677,522, an actuation unit is disclosed that includes two linear actuators selectively operative pivotally to rock an actuation lever to move the door lock coupled thereto between locked and unlocked modes. In such unit, the actuators are contracted in the normally de-energized condition of such unit to provide free pivotal movement of the actuation lever to permit manual locking and unlocking of the door independently of the door actuation system. Such actuation units can be mounted in each of the vehicle doors and operatively interconnected into a system in which all of the units are simultaneously remotely controlled from the driver's position in the vehicle.

Occasionally, however, one of the door locks in the vehicle system may be stuck or may be manually held in a particular locking mode while the system is being energized to effect movement to the opposite mode. In such an override situation, which might be caused, for example, by a child holding the lock lever in a locked mode while the driver is switching the system to an unlocked mode, the affected actuator will be energized and will attempt to undergo its expansion and contraction strokes. However, the pivotally mounted lever being held in place will not undergo the arcuate movement required to permit such expansion and contraction resulting in increased temperatures and pressures in the actuator in question and possible deleterious effects to the same.

The present invention overcomes the possibility, however remote, of one or more of the individual locks in a system being held against movement in the selected direction. This safety feature is effectuated by providing a three-member link or lever assembly interconnected normally to pivot concurrently but adapted to be independently rotated in a manual or physical override situation. This independent rotation is provided by interconnecting the three link members with a torsion spring mounted to one of the links and engaging or being engaged by the other two links normally to require concurrent rotation of all three. However, in an override situation, the spring flexes to permit the link being held to remain stationary while simultaneously allowing the link being engaged by the actuator independently to pivot thereby to permit the actuator normally to complete its expansion and contraction strokes.

Therefore, it is the principal object of the present invention to provide an actuation unit for vehicle door lock systems or the like permitting manual or physical override by allowing the energizing actuators normally to cycle.

It is yet another object of the present invention to provide a three-member link assembly cooperating with linear actuators to effectuate the locking and unlocking of vehicle doors, said three members normally being rotated concurrently but being independently rotatable in an override condition.

In the drawings:

FIG. 1 is a side elevation with a portion of the housing removed showing the actuation unit in a de-energized condition with the door locked;

FIG. 2 is a fragmentary elevation similar to FIG. 1 showing the left actuator in the expanded or outstroked position to unlock the door;

FIG. 3 is a fragmentary elevation similar to FIG. 2, but showing both actuators in section, with the right actuator expanded to the outstroked position to return the lock from the unlocked condition of FIG. 2 to the locked condition of FIG. 1;

Figure 4:
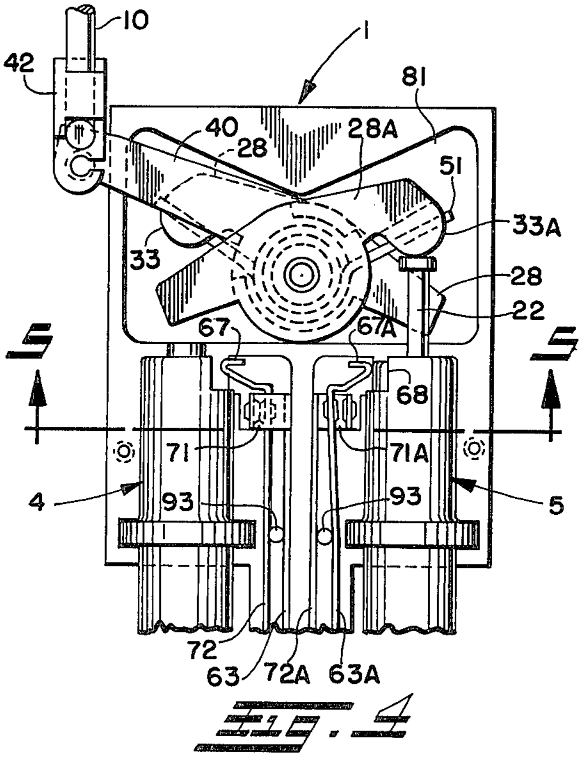
FIG. 4 is a fragmentary elevation similar to FIGS. 2 and 3 showing the right actuator energized to lock the door when the lock is being held in its unlocked mode, thereby to illustrate the lost motion connection permitting manual or physical override of the unit.
Figure 5:
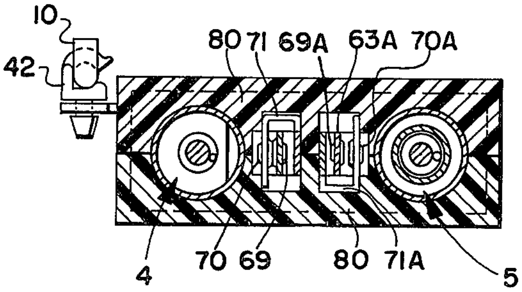
FIG. 5 is a sectional view taken along plane 5—5 in FIG. 4 illustrating certain details of the feed-back system for de-energizing the actuator and reversing the stroke.

Referring now in more detail to the drawings and initially to FIG. 1, the actuation unit, indicated generally at 1, is selectively operative to move an output device, such as a door lock 2, between two positions corresponding to the locked and unlocked modes of the same. The actuation unit 1 can be independently operative or may be part of a system in which similar units are positioned in each vehicle door for control by a remote conventional selector switch (not shown) at the driver's position in the vehicle. As illustrated, the actuation unit 1 is a single package including spaced linear actuators 4 and 5, a pivoted link assembly 7 cooperating therewith, and a feed-back control 8 for the actuators, all of which are encased in a common two-piece housing 9. This actuator unit or package may be readily assembled in a door or the like, with the unit being operatively coupled to the lock 2 by a cable, rod, or the like 10 in the manner described in more detail below in the discussion of the various elements generally defined and of the interrelated operation of such elements.

LINEAR ACTUATORS 4 AND 5

The two laterally spaced but horizontally aligned actuators 4 and 5 are of common construction, and the identical elements of the actuators have been identified by the same reference numerals in FIG. 3 wherein the instroked condition (actuator 4) and outstroked condition (actuator 5) have been shown in sectional detail. The actuators include a housing 12 having a variable volume chamber 14 formed in part by a rolling type diaphragm 15. The variable volume chamber 14 is at least partially filled with a thermally expansible and contractible fluid capable of undergoing a liquid to vapor phase change upon heating. A heating means 17 is preferably positioned in the variable volume chamber 14, with such heating means upon energization vaporizing a portion of the fluid contained therein to increase the pressure in the variable volume chamber. Such increased pressure results in the diaphragm 15 being driven outwardly from the instroked position shown for actuator 4 in FIG. 3 to the outstroked position shown for actuator 5 in FIG. 3, thereby correspondingly to expand the volume of chamber 14.

Such expansion movement results in the piston assembly, indicated generally at 20, being similarly outwardly driven. Such piston assembly 20 includes a piston 21, a piston rod 22, and a return spring 23. Such return spring, which is positioned between the piston 21 and the top end of housing 12, is operative positively to urge the piston assembly 20 back to the instroked position after de-energization of the actuator as discussed in more detail below. The outstroke movement of the piston assembly 20 results in the drive cap 24 on piston rod 22 engaging and pivoting the three-link pivoted assembly 7.

PIVOTALLY MOUNTED THREE LINK ASSEMBLY 7

Figure 6:
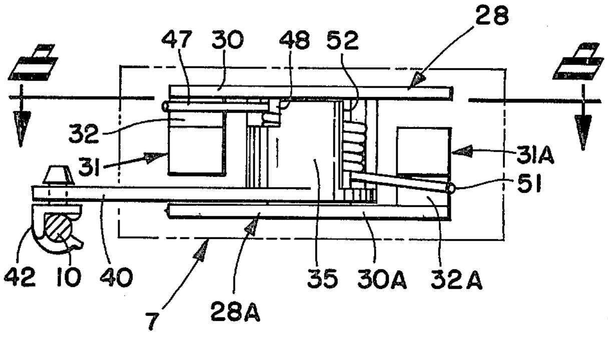
FIG. 6 is a plan view of the three-link pivotal assembly taken along the plane 6—6 in FIG. 1.
Figure 7:
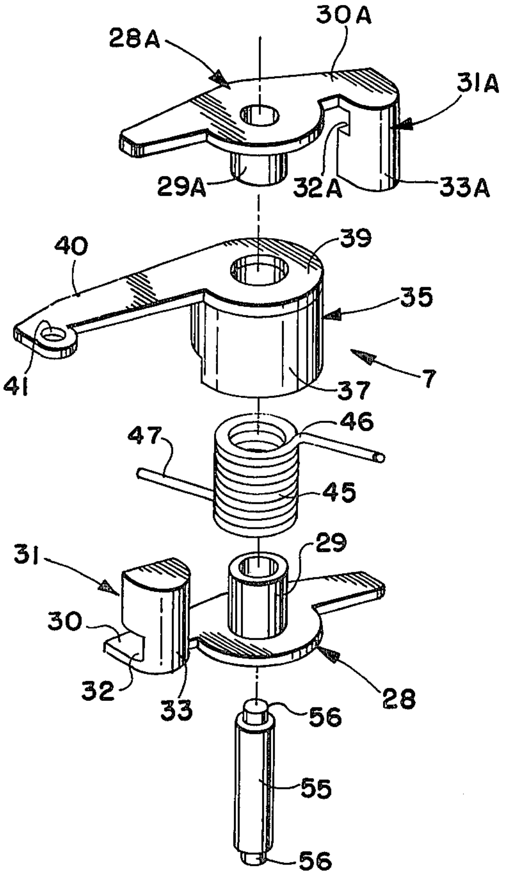
FIG. 7 is an exploded perspective of the structural elements forming the pivotal three-link assembly.
Figure 8:
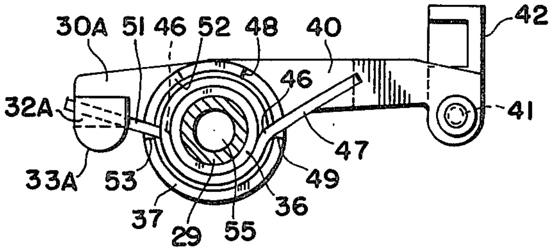
FIG. 8 is a sectional view taken along the plane 8—8 in FIG. 6 illustrating the torsion spring interconnection between the elements of the pivoted link assembly.

Turning to FIGS. 6, 7 and 8, the three-member pivoted link assembly includes a first drive link 28 having a generally axially extending cylindrical hub or mounting member 29 and a generally radially extending work arm 30. The terminal end of the work arm 30 is provided with an offset projection 31 having an upwardly facing recess 32 in its top surface and a rounded surface 33 for engagement by the drive cap 24 on the piston rod 22 aligned therewith. A second drive link 28A positioned at the other end of the three-link assembly is identically formed with the first link 28 but is oppositely assembled as will be described in more detail below. The structural elements of second drive link 28A corresponding to the structural elements of link 28 have been identified by the same reference numerals used in identifying such first link with the addition of the letter A suffix notation.

The intermediate link 35, which is alternately driven by first link 28 and second link 28A, includes two axially extending cylindrical members 36 and 37 commonly and concentrically connected to end plate 39, which has a radially outwardly extending work output lever 40. The distal end of the output lever 40 is provided with an eyelet 41 used to mount an adaptor 42 to which the lock cable 10 is connected.

A torsion spring 45 is positioned about and carried by the inner cylindrical member 36 of intermediate driven link 35, thereby to be positioned between concentric cylindrical members 36 and 37. The opposite ends of torsion spring 45 are bent as indicated at 46 to extend generally radially outwardly therefrom. One end 47 of torsion spring 45 extends through an arcuate recess 48 of limited circumferential extent in outer cylindrical member 37 of intermediate link 35, such spring end 47 normally resting against the flat 49 at the lower end of the recess 48. Such arcuate recess 48 permits limited arcuate movement or flexure of the spring end 47 away from the flat 49 in an override condition as described in more detail below. Similarly, the other end 51 of torsion spring 45 extends through a second aperture 52 of limited circumferential extent in the outer cylindrical member 37 of intermediate link 35, such spring end 51 normally resting against flat 53 at the lower end of recess 52. This second aperture 52 similarly permits arcuate movement or flexure of the spring end 51 away from flat 53 in an override condition.

For purposes of assembly, the intermediate link 35 with torsion spring 45 thereon is loosely positioned on a shaft 55, which has a diameter smaller than the inner diameter of the cylinder 36 as best shown in FIG. 8. The first drive link 28 is then rotatably mounted on shaft 55, with the hub 29 thereof being telescopically received in inner cylindrical member 36 of intermediate driven link 35. In such link position, the upwardly facing recess 32 on work arm 30 of first link 28 receives the end 47 of torsion spring 45.

The second drive link 28A is then similarly assembled on the opposite end of pivot shaft 55 with the working arm 30A thereof extending in a generally opposite radial direction from arm 30. The hub 29A of second drive link 28A is telescopically received in inner cylindrical member 36 of intermediate driven link 35, such hub 29A being in end to end abutment with hub 29 on first drive link 28. In the thus assembled position of second drive link 28A, the upwardly facing recess 32A on offset projection 31A receives end 51 of torsion spring 45.

The shaft 55, with the three links pivotally assembled thereon, is mounted to the housing 9 by the reduced diameter ends 56 thereof being received and retained in aligned holes in the housing 9. As thus assembled, the smoothly rounded surfaces 33 and 33A of the first and second drive members are respectively above and in alignment with linear actuators 4 and 5.

ACTUATOR FEEDBACK 8

Turning now to FIGS. 1–3, the heaters 17 of the actuators 4 and 5 are included in electrical circuits indicated generally at 60 and 60A, respectively, such circuits being operatively interrelated in the overall system circuit to permit selective actuation of one or the other. Since such circuits are generally identical in construction, only one of the circuits will be described in detail for purposes of convenience with the corresponding parts in the other circuit denoted by the same numeral with the letter A suffix notation.

Circuit 60 includes a generally L-shape spring contact arm 61 having a short, generally horizontally oriented leg 62 and a longer, generally vertically oriented leg 63. The horizontal leg 62 has a downwardly extending fold 65 therein that receives and is connected to a pin 66, which in turn extends into the actuator 4 to form the electrical lead for the heater. The circuit 60 also includes an electrically conductive strap 64, shown in phantom in FIG. 1, about part of the electrically conductive housing 12 of the actuator 4 to couple the latter in mechanical and electrical engagement to the frame, not shown, of the vehicle in which the actuation unit 1 is used. One end of the heater is welded to the inside of the housing 12 and is thus electrically coupled via the same and the strap 64 to the relative ground potential of the vehicle frame.

The vertical leg 63 of spring contact arm 61 terminates at its upper end in a rebent finger 67 extending through an aperture 68 in the top of housing 12 for linear actuator 4. The vertical leg 63 of spring arm 61 is, by its construction, normally biased toward the actuator 4. This biasing results in the contact 69 adjacent the top thereof normally engaging contact 70 on the yoke 71 of spade contact arm 72. This normal physical engagement between contacts 69 and 70 results in the circuit 60 normally being closed for selective actuation. Such actuation is initiated from a remote switch in the overall system, with unit 1 being installed in such system by the outwardly extending spade contact arms 72 and 72A being plugged into the harness 74 (FIG. 1) for the same. Actuation of such remote switch to the desired mode supplies relatively positive or negative power to the selected circuit 60 or 60A resulting in the heater 17 in such circuit being energized. As described above, this results in diaphragm 15 and piston assembly 20 being driven to the outstroked or expanded position. As the piston assembly approaches the end of such expansion movement; the leading or camming edge 75 on piston 21 engages the finger 67 extending through aperture 68 in housing 12. Such engagement results in finger 67 and leg 63 being cammed outwardly or away from the actuator resulting in contact 69 being driven away from contact 70.

This separation of contacts 69 and 70 results in the circuit 60 being opened to de-energize heater 17. As soon as the contained fluid in variable volume chamber 14 is sufficiently cooled, spring 23 will return the piston assembly 20 to the instroked condition illustrated for actuator 4 in FIG. 3. Such return of the piston assembly will result in the leading or camming edge 75 on the piston 21 losing its contact with finger 67 on spring contact arm 61. Such loss of contact will result in finger 67 re-entering the aperture 68 in housing 12 under the normal bias of vertical leg 63 of spring contact arm 61 resulting in contacts 69 and 70 being closed for selective subsequent energization of the circuit. If the selector switch is retained in the energized mode by the driver, upon reclosure of the contacts caused by piston assembly contraction, the heater is then re-energized to restart another expansion stroke and cycle as described above until the selector switch is released to permit complete piston assembly contraction.

HOUSING 9

The structural elements described above are preferably all encased within a common housing 9 which is readily mounted in a vehicle door or the like. Such housing includes two generally identical members formed from plastic or the like.

Each such member 80 forms half of the housing 9 and extends for the entire height thereof. Such member 80 is provided with a recess 81 configured to receive the pivotal link assembly 7 to permit pivotal movement thereof. The approximate center of such recess 81 is provided with a hole to receive and mount the reduce diameter shank portion 56 at one end of pivot pin 55, as described in detail above.

The member 80 is also provided with two spaced semicylindrical recesses 84 and 85 having intermediate increased diameter semicylindrical recesses 86 and 87. Such semicylindrical recesses 84–87 receive the linear actuators 4 and 5 fixedly to retain the same in the required spacial relationship. The semicylindrical recesses 84 and 85 are interrupted along their lengths by rectangular cutouts 89 and 90 which expose and thus provide direct access to portions of the actuators 4 and 5 for connection with the straps 64, 64A.

The housing 80 is also provided with two oppositely facing generally L-shape channels 92 respectively to receive the switch contact arm 61 and spade contact arm 72 for each of the circuits 60 and 60A. Such L-shape channels 92 are provided along the vertical legs thereof with pin-like projections 93 to maintain a spaced relationship between the spring contact arm 61 and spade contact arm 72. Such pins 93 form the fulcrum points for the vertical legs 63 of spring contact arms 61, about which fulcrum points the pivotal movement of the same occurs during energization of the actuators as described above.

As will be appreciated, the parts of the actuation unit are assembled in one member 80 and the necessary electrical connections made. The other member is then placed over such assembly to receive the exposed parts of the unit in correspondingly mated recesses to complete the housing 9. Such members 80 are then joined by suitable fasteners passing through aligned holes 95 in such members 80, thereby tightly to retain the parts in assembled positions.

THE OPERATION OF THE ACTUATOR UNIT

Referring now to FIGS. 1, 2 and 3, the normal locking and unlocking cycle of the actuator unit can be described beginning initially with FIG. 1 in which the door is in its locked mode and the two linear actuators 4 and 5 are in their normally contracted de-energized condition. Upon the switch for the system being moved to a position for unlocking, circuit 60 is energized resulting in the heater 17 in actuator 4 being energized to drive the diaphragm 15 and piston assembly 20 thereof through the expansion stroke. This results in drive cap 24 on piston 22 engaging surface 33 on drive link 28, resulting in the latter pivoting in a clockwise direction as viewed in FIG. 2. Such clockwise pivotal movement will concurrently drive spring end 47, spring 45, intermediate link 35, and second drive link 28A in a clockwise direction as viewed in FIG. 2. Such clockwise pivotal movement of the intermediate link 35 will result in work arm 40 pivoting from the FIG. 1 position to the FIG. 2 position thereby to drive cable 10 upwardly to unlock the door.

As the piston assembly 20 approaches its outstroked position, the finger 67 on spring contact arm 61 will be moved outwardly by cam 75 on piston 21 resulting in separation of the contacts 69 and 70. With such separation, the circuit 60 is opened resulting in de-energization of the heater 14 and the spring return of the piston assembly 20 to the normally contracted position of the actuator. Such contraction will result in drive cap 24 of the piston rod 22 losing its engagement with surface 33 to return to the phantom line position 24' of such member in FIG. 2, with the three-member pivoted assembly 7 remaining in the orientation illustrated therein.

When it is desired to change the system from an unlocked (FIG. 2) to a locked mode (FIG. 3), the system switch is so thrown resulting in circuit 60A being energized to result in expansion of actuator 5. Such expansion results in counterclockwise pivotal movement of the three-link pivoted assembly 7, with the cable 10 being driven downwardly by lever 40 on intermediate link 35 to result in the door being locked as illustrated in FIG. 3. Such locked position is attained when the piston assembly 20 has reached its outstroked position, with the cam 75 breaking the circuit contact at such point for piston assembly reversal and contraction as described above in conjunction with the operation of linear actuator 4.

The normally contracted position of the two actuators, as illustrated in FIG. 1, permits a selective change of lock mode without actuation of the system and/or unit. Specifically, in FIG. 1, the lock lever of the door can be manually pulled upwardly resulting in similar movement for cable 10 to pivot the three-link assembly 7 to the orientation illustrated in FIG. 2. Conversely, if it is desired manually to lock an unlocked door, the lock lever and cable 10 in FIG. 2 may be manually pushed downwardly resulting in the three-member link assembly 7 pivoting in an opposite counterclockwise direction to place surface 33 against the drive cap 24.

Occasionally a door lock 2 will be manually or physically held in one lock mode while the system has been energized to effectuate movement to the other lock mode. This somewhat remote potentiality has been illustrated in FIG. 4 in which the lock 2 is being retained in the unlocked position. As such, the cable 10 keeps the work lever 40 and intermediate link 35 in the orientation illustrated in FIG. 4 in spite of the expansion of linear actuator 5 which would normally move the cable 10 to the down or unlocked position. Since the intermediate link 35 is not free to move, the spring 45 coils or flexes instead because of its preselected stiffness to move away from the stop or flat 53. As illustrated in FIG. 4, such spring flexure allows independent pivotal movement of the second drive line 28A to permit the normal expansion and contraction cycle of actuator 5 to be completed even though the lock is being held in a mode which would otherwise resist and preclude such movement. Conversely, if the lock was being held in its locked position as illustrated in FIG. 1 when the system was being actuated to the unlocked mode, the torsion spring 45 would permit the first drive link 28 to pivot independently of the other members so that actuator 4 could complete its normal expansion and contraction cycle. This independent movement of the first or second drive links in an override condition thus permits normal cycling for the actuators thereby to avoid possible deleterious effects that might otherwise occur.

I, therefore, particularly point out and distinctly claim as my invention:

1. An actuator unit comprising two selectively energized spaced linear actuators each having an expansion stroke and a contraction stoke, said actuators being contracted when deenergized, a pivotally mounted lever assembly positioned adjacent said actuators to place the pivotal mount between the actuators and respectively to align each side of the lever assembly with the actuators for selective engagement thereby, output means connected to said lever assembly to be moved between at least two positions by the pivotal movement of the lever assembly, control means operative selectively to energize either of said actuators during the entire expansion stroke thereof during which the side of the lever assembly aligned therewith is engaged pivotally to move the assembly to change the position of the output means and then to deenergize the same for its contraction stroke to complete its cycle in its normally contracted condition, the lever assembly including a lost motion means to permit an energized actuator normally to complete its expansion and contraction cycle even if the output means is being held to preclude movement to the position that would normally result from energization of said actuator.

2. The actuator unit defined in claim 1 wherein the output device is a door lock and the two positions of such output device respectively correspond to the locked and unlocked conditions of such door lock.

3. The actuator unit defined in claim 1 wherein the control means includes a feedback means which senses the substantially completed expansion of the actuator and automatically reverses the same for contraction and subsequent cycle completion.

4. The actuator unit defined in claim 3 wherein each of said actuators includes a body having a variable volume chamber therein at least partially formed by a diaphragm and a piston means mounted on said diaghragm which moves outwardly during expansion to engage and move said assembly.

5. The actuator unit defined in claim 4 wherein the actuator body has an aperture therein adjacent its end and the feedback means includes a spring arm, the end of which extends through the aperture in said actuator body.

6. The actuator unit defined in claim 5 wherein the piston means has a cam thereon to engage the end of said spring arm near the completion of the expansion stroke to change the position of such arm, with such position change resulting in deenergization of said actuator and contraction of said variable volume chamber under spring bias.

7. The actuator unit defined in claim 1 wherein the pivotally mounted lever assembly includes three links and the lost motion means is a torsion spring normally simultaneously interconnecting said links for concurrent pivotal movement but permitting independent movement thereof when the output means is being held to preclude the selected movement of such output means.

8. The actuator unit defined in claim 7 wherein the torsion spring is mounted on a first link which includes an outwardly extending lever having a connection at the end thereof to the output device.

9. The actuator unit defined in claim 8 wherein the first link is positioned between the second and third links which include arms that extend radially outwardly in substantially opposite directions.

10. The actuator unit of claim 9 wherein the ends of the arms on the second and third links include means to receive the opposite ends of the torsion spring and further include means for engagement by the actuator aligned therewith.

* * * * *